United States Patent
Falk (10) Patent No.: US 9,252,956 B2
(45) Date of Patent: Feb. 2, 2016

(54) METHOD AND SYSTEM FOR TRANSMITTING CONTROL DATA IN A MANNER THAT IS SECURED AGAINST MANIPULATION

(75) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/813,867

(22) PCT Filed: Jul. 22, 2011

(86) PCT No.: PCT/EP2011/062639
§ 371 (c)(1),
(2), (4) Date: Feb. 1, 2013

(87) PCT Pub. No.: WO2012/016857
PCT Pub. Date: Feb. 9, 2012

(65) Prior Publication Data
US 2013/0132730 A1      May 23, 2013

(30) Foreign Application Priority Data
Aug. 3, 2010   (DE) .......................... 10 2010 033 229

(51) Int. Cl.
*H04L 29/06* (2006.01)
*H04L 9/32* (2006.01)
*H04L 12/46* (2006.01)

(52) U.S. Cl.
CPC ............ *H04L 9/3236* (2013.01); *H04L 9/3215* (2013.01); *H04L 9/3223* (2013.01); *H04L 12/4616* (2013.01); *H04L 63/123* (2013.01)

(58) Field of Classification Search
CPC .... H04L 9/3236; H04L 9/3215; H04L 63/123
See application file for complete search history.

(56) References Cited

U.S. PATENT DOCUMENTS 6,961,429 B1 * 11/2005 Hill et al. ...................... 380/200
7,103,779 B2    9/2006 Kiehtreiber et al.
(Continued)

FOREIGN PATENT DOCUMENTS

CN   1360772   7/2002
CN   1487740   4/2004
(Continued)

OTHER PUBLICATIONS

"Chapter 11: Digital Signatures EO—Menezes A J; Van Oorschot P C; Vanstone S A", Handbook of Applied Cryptography; [CRC Press Series on Oiscrete Mathematices ANO Its Applications], CRC Press Series on Oiscrete Mathematics ANO Its Applications, Boca Raton, FL, US, pp. 425-488 Oct. 1, 1996 Internet: URL: http://www.cacr.math.uwaterloo.ca/hac/about/chap11.pdf; Book.

*Primary Examiner* — Victor Lesniewski
(74) *Attorney, Agent, or Firm* — Cozen O'Connor (57) ABSTRACT

A method and system for detecting manipulation when control data are transmitted from a first control unit to a second control unit via a network, which includes generating integrity check information data for the control data transmitted by the first control unit via an integrity check generating unit on the transmitter side, calculating a cryptographic checksum for the integrity check information data generated on the transmitter side via the integrity check generating unit, transmitting the integrity check information data and the cryptographic checksum to an integrity check verifying unit that verifies the cryptographic checksum on the receiver side, generating integrity check information data on the receiver side for the control data received by the second control unit using the integrity check verifying unit, and comparing the integrity check information data and the integrity check information data with the cryptographic checksum to detect the manipulation of the transmitted control data.

21 Claims, 4 Drawing Sheets

(56) References Cited

U.S. PATENT DOCUMENTS

| | | | |
|---|---|---|---|
| 7,590,855 B2 * | 9/2009 | Irwin | 713/181 |
| 8,204,588 B2 * | 6/2012 | Severin et al. | 607/5 |
| 8,438,392 B2 * | 5/2013 | Oxford | 713/169 |
| 8,572,382 B2 * | 10/2013 | De Lutiis et al. | 713/170 |
| 8,639,922 B2 * | 1/2014 | Phatak | 713/156 |
| 8,644,959 B2 * | 2/2014 | Hermann | 700/11 |
| 8,725,135 B2 | 5/2014 | Weyl et al. | |
| 2002/0162000 A1 | 10/2002 | Benzler | |
| 2003/0120924 A1 * | 6/2003 | Immonen | 713/170 |
| 2004/0059917 A1 | 3/2004 | Powers | |
| 2005/0066104 A1 * | 3/2005 | Train et al. | 710/305 |
| 2005/0066169 A1 | 3/2005 | Kiehtreiber et al. | |
| 2005/0108617 A1 | 5/2005 | Lappin, Jr. | |
| 2005/0228983 A1 * | 10/2005 | Starbuck et al. | 713/151 |
| 2005/0281406 A1 * | 12/2005 | Hill et al. | 380/200 |
| 2007/0287439 A1 | 12/2007 | Weyl et al. | |
| 2008/0005558 A1 | 1/2008 | Hadley et al. | |
| 2008/0178257 A1 * | 7/2008 | Mishina | H04L 9/088 726/2 |
| 2009/0054937 A1 * | 2/2009 | Severin et al. | 607/5 |
| 2009/0204695 A1 * | 8/2009 | Busgen et al. | 709/223 |
| 2009/0210613 A1 | 8/2009 | Mueller et al. | |
| 2009/0210707 A1 * | 8/2009 | De Lutiis et al. | 713/170 |
| 2010/0074262 A1 * | 3/2010 | Breit et al. | 370/400 |
| 2010/0114334 A1 * | 5/2010 | Krumsiek | 700/3 |
| 2010/0268692 A1 * | 10/2010 | Resch | G06F 11/1044 707/687 |
| 2012/0011569 A1 * | 1/2012 | Chou | H04L 9/0637 726/4 |

FOREIGN PATENT DOCUMENTS

| | | |
|---|---|---|
| CN | 1842757 | 10/2006 |
| CN | 1980375 | 6/2007 |
| CN | 101080693 | 11/2007 |
| DE | 10 2006 003 167 | 8/2007 |
| DE | 10 2006 038 428 | 2/2008 |
| WO | WO 0072502 | 11/2000 |

* cited by examiner

METHOD AND SYSTEM FOR TRANSMITTING CONTROL DATA IN A MANNER THAT IS SECURED AGAINST MANIPULATION

CROSS-REFERENCE TO RELATED APPLICATIONS

This is a U.S. national stage of application No. PCT/EP2011/062639 filed 22 Jul. 2011. Priority is claimed on German Application No. 10 2010 033 229.1 filed 3 Aug. 2010, the content of which is incorporated herein by reference in its entirety.

BACKGROUND OF THE INVENTION

1. Field of the Invention

The invention relates to a method and a system for transmitting control data between control units of a network in a manner that is secured against manipulation.

2. Description of the Related Art

Figure 1:
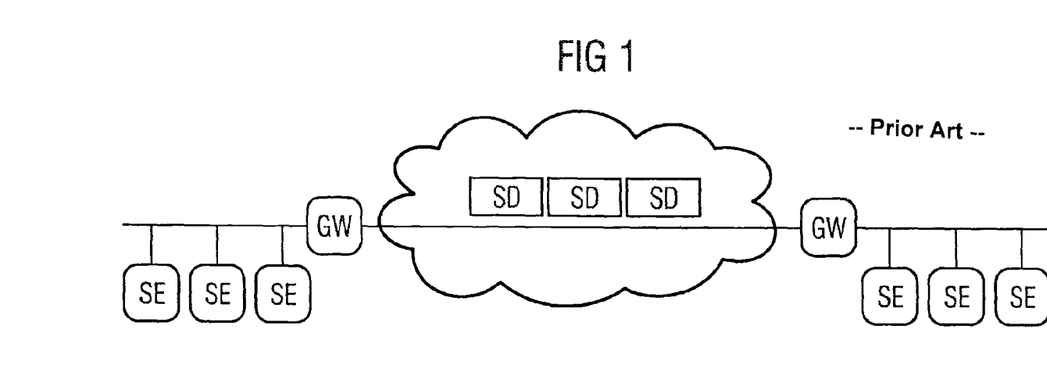
FIG. 1 is a schematic block diagram illustrating the data transmission between control units for a transmission network in a conventional system.

FIG. 1 shows a representation of a conventional network, where control data are transmitted or exchanged between control units. In the example shown in FIG. 1, two control networks are connected to one another via a transmission network. The two control networks each have a gateway for connection to the transmission network. The two control networks each contain a plurality of control units SE that are connected, for example, via a bus to the gateway of the control network. The two control networks exchange control data SD1, SD2, SD3 . . . via the transmission network. The control units SE can be different devices, such as control computers, memory-programmable control systems, robot arms, sensors or actuators. It is also possible that a control network communicates with a control center via the transmission network, such as a SCADA system.

A transmission network can involve, for example, an Ethernet-based or an IP-based production network that connects control networks of different production cells to one another. A transmission network can also be a train network that connects networks of different train wagons to one another. Trains have, for example, data networks for performing the train control or vehicle control or other operating functions. Furthermore, the transmission network can be a network of an energy automation network.

The need for correct execution of the control monitoring functions makes it necessary for the control network and the control components or control units connected by the network to function properly. However, if the control network is manipulated, this is not assured. As a result, proper operation and possibly also the reliability of the controlled system can be impaired.

In an environment arranged spatially compact, the control network can be protected against manipulation using physical protective measures so that the control network is not accessible to a hacker. However, in the case of distributed networks that are installed, for example, in a production plant or a vehicle, for example, in a train, this is not possible. In distributed control networks of this type, control data are typically transmitted via a transmission network between separate network regions. Thus, for example, data transmission can occur between train parts (wagons). Furthermore, data transmission can occur between spatially separate regions within a train, for example, between a switchgear cabinet and a control component that are installed in a roof container or in the floor of a train wagon. Furthermore, control data are transmitted, for example, from a signal box to a trackside signaling unit or a set of points. A further example is the transmission of data between production cells that have different control networks. Furthermore, data transmission can be performed between a sensor/actuator and a control unit of a process automation system of, for example, a refinery, via a transmission network. A further example is the transmission of data between a substation controller of an energy automation system and a control center.

Control networks are therefore often physically protected against access, such as in special cable ducts, so as not to be accessible to third parties, hindering manipulation as much as possible. However, this is typically expensive and, due to the complex installation and the necessity for enabling servicing activities to be performed, not generally applicable.

It is also known to protect data during transmission by means of a checksum, for example, with a CRC checksum. This checksum is suitable only for recognizing random transmission errors. Therefore, conventionally, cryptographic checksums are employed or utilized, for example, a Message Authentication Code or a digital signature. The control data transmitted are herein enhanced with a cryptographic checksum. The cryptographic checksum is checked on receipt. Only control data for which the cryptographic checksum has been successfully checked are further processed on the side of the receiving control device. The transmitted control data are therefore protected by the cryptographic checksum. However, cryptographic protection of this type can only be integrated into existing components with difficulty because a particular computational effort, a particular memory space and a particular retrofitting effort is required. The provision of a separate upstream encryption component that encrypts the data before the transmission or provides the data with a cryptographic checksum can also only be realized with a substantial technical effort. A further disadvantage lies therein that the cryptographic computation operations performed lead to delays, which is undesirable, particularly during real-time-critical control and regulation tasks or can even impair security. Furthermore, the provision of an upstream encryption component of this type is not without effects on the relevant control system.

SUMMARY OF THE INVENTION

It is therefore an object of the present invention to provide a method and a system for transmitting control data in a manner that is secured against manipulation between control units via a network that can be implemented with little technical effort, but which offers a high level of protection against manipulation during the transmission of control data.

This and other objects and advantages are achieved in accordance with the invention by providing a method for recognizing manipulation during the transmission of control data from a first control unit to a second control unit via a network, comprising the steps:

(a) generation of integrity check information data on the transmitter side for the control data that are transmitted by the first control unit via an integrity check generating unit;

(b) calculation of a cryptographic checksum for the integrity check information data generated on the transmitter side via the integrity check generating unit using a cryptographic key;

(c) transmission of the integrity check information data generated on the transmitter side and the corresponding cryptographic checksum that is calculated by the integrity check generating unit to an integrity check verifying unit which verifies the cryptographic checksum on the receiver side using a cryptographic key;

(d) generation of integrity check information data on the receiver side for the control data that are received by the second control unit using the integrity check verifying unit; and (e) comparison of the integrity check information data generated on the receiver side by the integrity check verifying unit and the integrity check information data which are generated on the transmitter side and which are received together with the cryptographic checksum which is verified by the integrity check verifying unit to detect manipulation of the transmitted control data.

In a possible embodiment of the method according to the invention, the control data are transmitted unencrypted in control data packets that contain packet administration data and useful data.

In another possible embodiment of the method according to the invention, the integrity check information data generated are formed by a hash value of at least part of the control data and/or the packet administration data contained in a control data packet or in a particular number of control data packets.

In another possible embodiment of the method according to the invention, the integrity check information data are generated by the integrity check generating unit for each control data packet, where the integrity check information data comprises a hash value of the packet administration data of the control data packet, a hash value for the useful data of the control data packet, and a time stamp recording the time point of the generation of the integrity check information data on the transmitter side.

In another possible embodiment of the method according to the invention, the integrity check information data are generated at regular time intervals by the integrity check generating unit.

In another possible embodiment of the method according to the invention, the control data are transmitted via a wireless or a wire-bound transmission network in real time.

In another possible embodiment of the method according to the invention, the cryptographic checksum calculated by the integrity check generating unit is transmitted together with the integrity check information data generated on the transmitter side via the transmission network for the control data or via a separate communication connection from the first control unit to the second control unit.

In another possible embodiment of the method according to the invention, on recognizing a manipulation arising during transmission of the control data from the first control unit to the second control unit, the integrity check verifying unit generates an alarm signal and transmits the generated alarm signal to the second control unit.

In another possible embodiment of the method according to the invention, after reception of the alarm signal by the integrity check verifying unit, the second control unit switches to an operationally secure state.

It is also an object of the invention to also provide a data transmission system for transmitting control data from a first control unit to a second control unit via a network, comprising:

(a) at least one integrity check generating unit that generates integrity check information data on the transmitter side for the control data transmitted by the first control unit and calculates a cryptographic checksum for the generated integrity check information data using a cryptographic key, and (b) at least one integrity check verifying unit that receives the integrity check information data generated by the integrity check generating unit on the transmitter side and receives the associated calculated cryptographic checksum and verifies the cryptographic checksum using a cryptographic key, where the integrity check verifying unit generates the integrity check information data for the control data received by the second control unit on the receiver side and compares the integrity check information data generated on the receiver side with the integrity check information data received and generated on the transmitter side together with the verified cryptographic checksum, in order to recognize manipulation of the transmitted control data.

In a possible embodiment of the data transmission system according to the invention, the first control unit is connected to a first control network that comprises a first gateway, where the second control unit is connected to a second control network that comprises a second gateway, and the two gateways of the control networks are connected to one another via a transmission network.

In another possible embodiment of the data transmission system according to the invention, the first control network, the second control network and/or the transmission network is an Ethernet, in particular a Profinet.

In another possible embodiment of the data transmission system according to the invention, the control units each comprise sensors, actuators and a control computer.

In another possible embodiment of the data transmission system according to the invention, the network is a vehicle network, in particular a train network.

In another possible embodiment of the data transmission system according to the invention, the network is an energy control network.

In yet another possible embodiment of the data transmission system according to the invention, the network is an automation control network, in particular a process control network or a production control network.

In another possible embodiment of the data transmission system according to the invention, the integrity check generating unit is integrated into the first gateway of the first control network and the integrity check verifying unit is integrated into the second gateway of the second control network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Possible embodiments of the method according to the invention of the data transmission system according to the invention, for manipulation-proof transmission of control data between control units via a network will now be described making reference to the attached figures, in which.

DETAILED DESCRIPTION OF THE PREFERRED EMBODIMENTS

Figure 2:
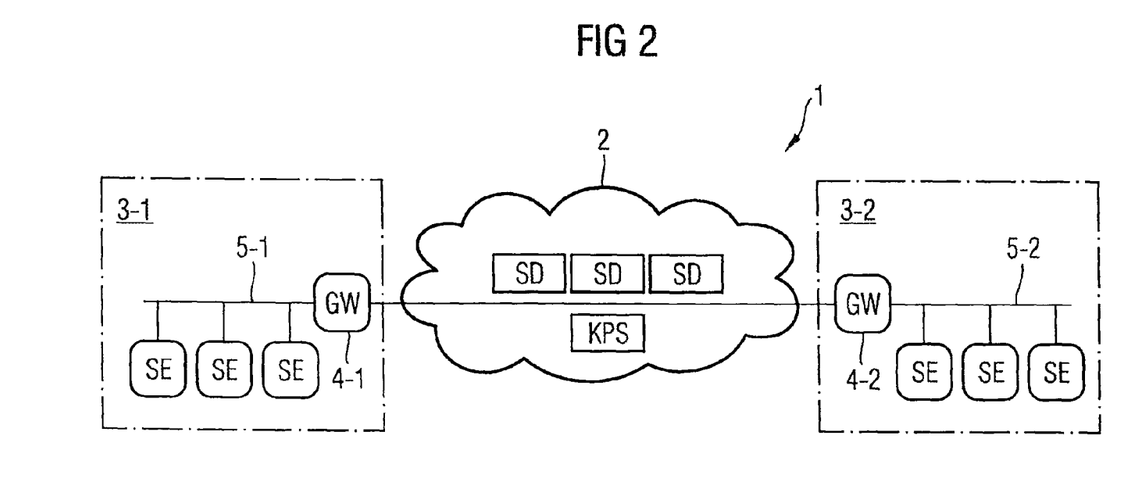
FIG. 2 is a schematic block diagram illustrating a possible embodiment for transmitting control data between control units in a manner that is secured against manipulation in a data transmission system according to the invention.

As FIG. 2 shows, in a possible embodiment of the data transmission system 1 according to the invention, control data SD are transmitted between control units SE via a transmission network 2 of the data transmission system 1. In the exemplary embodiment shown in FIG. 2, two separate control networks 3-1 and 3-2 are linked to one another via the transmission network 2. In the exemplary embodiment shown in FIG. 2, the control networks 3-1 and 3-2 each have a gateway 4-1, 4-2 for connecting the respective control network to the transmission network 2. At least one control unit SE is connected to each of the gateways 4-1, 4-2 via a bus 5-1. The two control networks 3-1, 3-2 constitute, for example, control networks of different production cells in a production plant.

Figure 4:
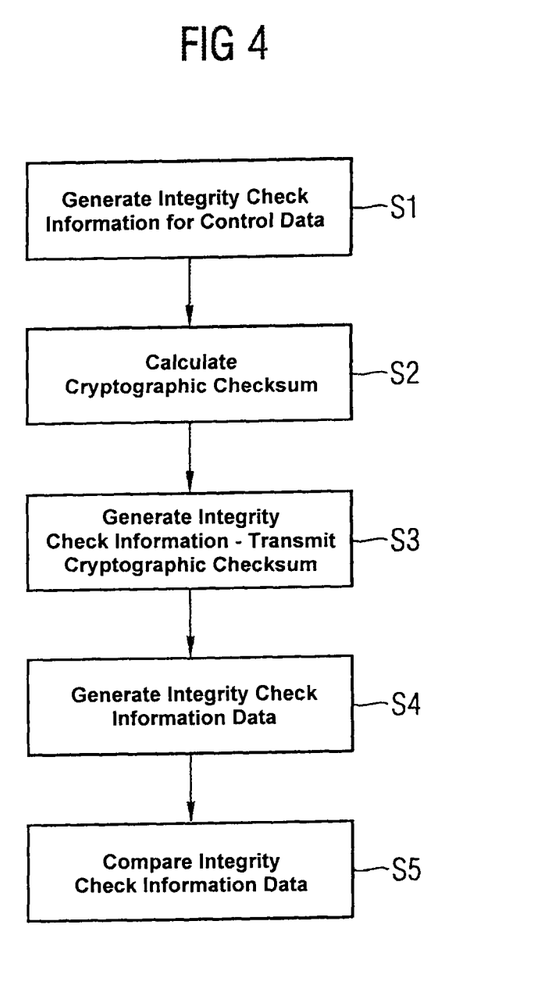
FIG. 4 is a flow diagram illustrating a possible embodiment of the method according to the invention for transmitting control data between control units in a manner that is secured against manipulation.

In the method according to the invention, firstly, in a step S1, as shown in the flow diagram of FIG. 4, on the transmitter side, i.e., on the side of a transmitting control unit SE, integrity check information data IPID is generated for the control data transmitted by the control unit by an integrity check generating unit IPEE. The integrity check generating unit IPEE can be integrated, for example, into the first gateway 4-1 of the first control network 3-1.

In a further step S2, a cryptographic checksum KPS is calculated on the transmitter side for the integrity check information data IPID generated on the transmitter side, by the integrity check generating unit IPEE using a cryptographic key. In a possible embodiment, the integrity check generating unit IPEE integrated into the gateway 4-1 of the first control network 3-1 receives control data from a control unit SE of the first control network 3-1 connected via the bus 5-1 and generates the integrity check information data IPID for the control data received from the control unit SE. The integrity check generating unit IPEE integrated into the gateway 4-1 subsequently calculates a cryptographic checksum KPS for the integrity check information data IPID generated on the transmitter side, using a cryptographic key.

Subsequently, in a step S3, the integrity check information data IPID generated on the transmitter side and the associated cryptographic checksum KPS calculated by the integrity check generating unit IPEE are transmitted with the control data SD or, temporally offset, to an integrity check verifying unit IPVE that is integrated, for example, into the gateway 4-2 of the second control network 3-2. In one embodiment, the transmission of the integrity check information data IPID is performed separately from the transmission of the control data SD. In particular, the transmission of the integrity check information data IPID and the control data SD can be performed in different data frames or different data packets. In another embodiment, the transmission of integrity check information data IPID and the control data SD occurs over different networks or over different virtual local networks VLAN. The integrity check verifying unit IPVE verifies the cryptographic checksum KPS obtained, using a cryptographic key.

In a further step S4, integrity check information data IPID' are generated by the integrity check verifying unit IPVE on the receiver side for the control data SD received unencrypted.

In a further step S5, the integrity check information data IPID' generated on the receiver side by the integrity check verifying unit IPVE are compared with the integrity check information data IPID generated on the transmitter side that are received together with the cryptographic checksum KPS that is verified by the integrity check verification unit IPVE, to identify manipulation of the transmitted control data SD.

As shown in FIG. 2, in one possible embodiment, the control data SD are transmitted in control data packets that comprise packet administration data and useful data. In the method according to the invention, the control data SD are transmitted unaltered and unencrypted via the transmission network 2. However, cryptographically protected checking information or a cryptographic checksum KPS is also transmitted for control data SD, separately from the control data, via the transmission network 2. In the exemplary embodiment shown in FIG. 2, the gateway 4-1 of the first control network 3-1 transmits, in addition to the control data SD that are transmitted from the first control network 3-1 to the second control network 3-2, cryptographic checking information or a cryptographic checksum KPS which is checked by the second gateway 4-2. In the method according to the invention, the control data cryptographically protected by the transmission network 2 are detected at a checking site and checking information of the control data SD are transmitted, separately from the control data, to a remote checking unit. In the example shown in FIG. 2, the remote checking unit, i.e., the integrity check verifying unit IPVE is provided in a separate partial network. The integrity check verifying unit IPVE also detects the control data SD received via the transmission network 2 and performs checking using the received check information. If the integrity check information data IPID' generated on the receiver side deviate from the integrity check information data IPID generated on the transmitter side, the possibility exists that the transmitted control data SD have been manipulated. In this event, a control action or an error handling action can be initiated. In one possible embodiment, on identifying a manipulation that has occurred during the transmission of the control data SD from the first control unit SE1 to the second control unit SE2, the integrity check verifying unit IPVE generates an alarm signal and transmits the alarm signal, for example, to the second control unit SE2. After reception of the alarm signal by the integrity check verifying unit IPVE, the second control unit can switch to an operationally secure state. Alternatively, the whole receiving control network 3-2 can be switched to an operationally secure state. It is also possible for the alarm signal to be displayed only to an operating person. The operationally secure state can be initiated, for example, by an emergency switch-off or an emergency stop. It is also possible for the network-based control to be restricted to the operationally secure state, for example, in that the relevant gateway is blocked. In this event, only automatic control occurs. Furthermore, a warning message to an operating person or an explicit warning confirmation can be requested by an operating person.

In another possible embodiment of the method according to the invention, the integrity check information data IPID generated on the transmitter side in step S1 is formed by a hash value of at least part of the control data and/or packet administration data contained in a control data packet or in a particular number of control data packets. In order to calculate the hash value, a cryptographic hash function can be used, such as MD5, SHA-1, SHA256. In a possible embodiment, the integrity check information data IPID are generated by the integrity check generating unit IPEE for each control data packet. The integrity check information data IPID can have a hash value of the packet administration data of the control data packet, a hash value of the useful data of the control data packet and a time stamp to specify a time point of the creation of the integrity check information data IPID on the transmitter side.

In another possible embodiment of the method according to the invention, the integrity check information data IPID are generated in step S1 at regular time intervals by the integrity check generating unit IPEE. In another possible embodiment, the cryptographic checksum KPS calculated by the integrity check generating unit IPEE is transmitted together with the integrity check information data IPID generated on the transmitter side via the transmission network 2. Alternatively, the calculated cryptographic checksum KPS is transmitted via a separate communication connection from the first control unit SE1 of the first control network 3-1 to the second control unit SE2 of the second control network 3-2. Each of the control units SE shown in FIG. 2 can be provided with sensors, actuators and an integrated control computer.

Figure 3:
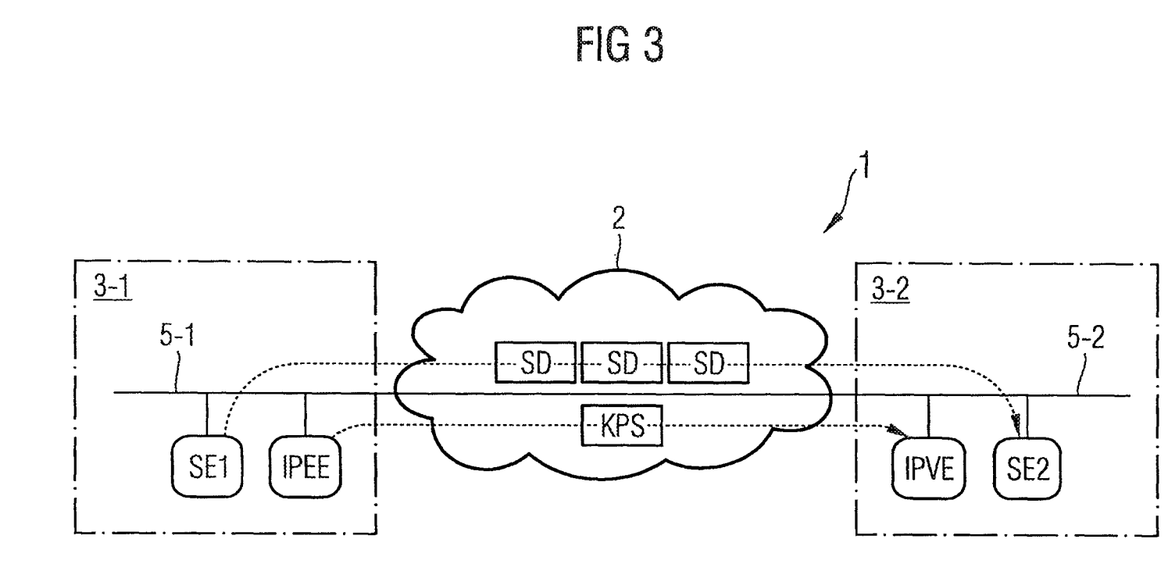
FIG. 3 is a further schematic block diagram illustrating a possible embodiment for transmitting control data between control units in a manner that is secured against modulation in a data transmission system according to the invention.

In the embodiment shown in FIG. 2, the integrity check generating unit IPEE is integrated into the first gateway 4-1 of the first control network 3-1 and the integrity check verifying unit IPVE is integrated into the second gateway 4-2 of the second control network 3-2. In an alternative embodiment, the integrity check generating unit IPEE and the integrity check verifying unit IPVE can be configured as a separate additional device. FIG. 3 shows an exemplary embodiment of this type. The integrity check generating unit IPEE and the integrity check verifying unit IPVE each constitute a separate device that can be connected to the respective control network. For example, these additional units IPEE and IPVE can be configured as a series connection group. In a further possible embodiment, the integrity check generating unit IPEE can be integrated into a transmitting control unit SE and the integrity check verifying unit IPVE can be integrated into a receiving control unit SE. In a possible embodiment, an additional device comprises both an integrity check generating unit IPEE and an integrity check verifying unit IPVE and is therefore usable on both sides of the transmission.

In another possible embodiment, the check information or the calculated cryptographic checksum KPS can be transmitted cryptographically protected, for example, via MACsec, IPsec or SSL/TLS. The check information can be protected by a cryptographic checksum, for example, a Message Authentication Code or a digital signature.

In another possible embodiment, the check information or the calculated cryptographic checksum KPS is transmitted in a delayed manner. For example, the check information or the cryptographic checksum KPS is transmitted every 1 second or every 5 seconds or every 60 seconds. In this embodiment, the receiving control unit can process the received control data SD directly. If the check information or the cryptographic checksum KPS received later by the control unit indicates a possible manipulation, the receiving control unit SE2 can react accordingly.

In a possible embodiment, the control data SD are transmitted via a wire-bound transmission network. In an alternative embodiment, the control data SD are transmitted via a wireless transmission network 2. In another possible embodiment, the transmission of the control data SD occurs in real time.

Figure 5:
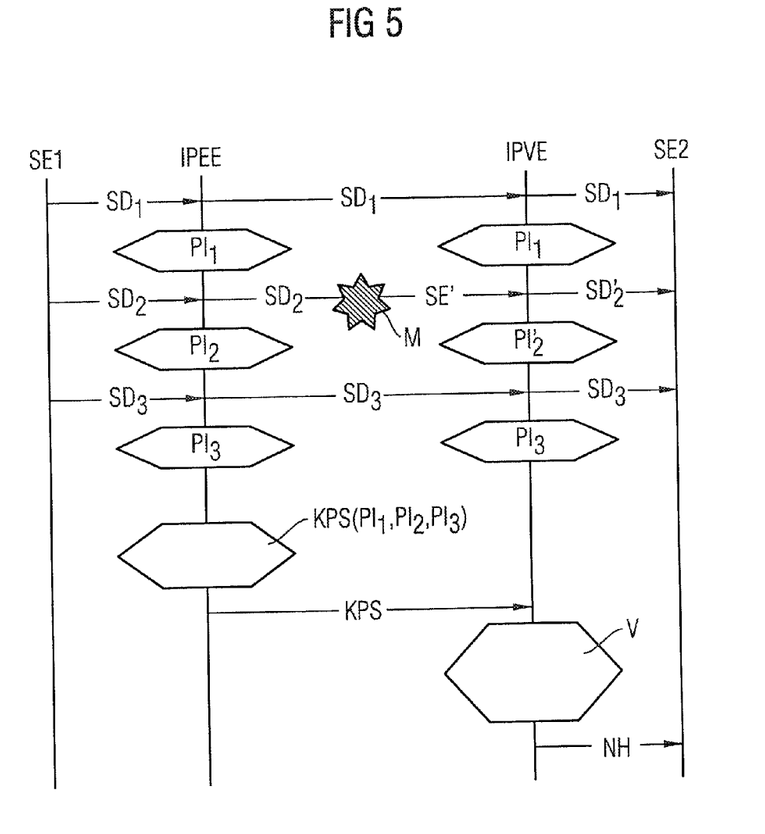
FIG. 5 is a signal diagram for illustrating a possible embodiment of the method according to the invention for transmitting control data between control units in a manner that is secured against manipulation.

FIG. 5 shows an example to illustrate the method according to the invention for transmitting data between control units SE in a manner that is secured against manipulation. In the example shown, a control unit SE1 transmits three control data packets SD to a second control unit SE2 which is provided, for example, in the second control network 3-2. The integrity check generating unit IPEE determines cryptographically protected check information for the control data SD and transmits the check information to the integrity check verifying unit IPVE. Here, the integrity check verifying unit IPVE checks, based on the cryptographic checksums KPS obtained, whether the received control data SD are correct. If not, an alarm signal is generated by the integrity check verifying unit IPVE. The alarm signal can be transmitted to the receiving control unit SE2 which switches to an operationally secure state.

As FIG. 5 shows, in the case of the second control data packet SD in the example shown, a manipulation M occurs. In the example shown, only after the transmission of three control data packets SD1, SD2, SD3 is a cryptographic checksum KPS calculated by the integrity check generating unit IPEE: KPS=F($PI_1$, $PI_2$, $PI_3$), where F is a cryptographic function. This calculated cryptographic checksum KPS is transmitted to the integrity check generating unit IPVE. In the example shown in FIG. 5, for each transmitted control data packet SD, an item of check information PI is formed by the integrity check generating unit IPEE and is placed into temporary storage. Following transmission of a pre-determined number HI3 of control data packets SD, calculation of the cryptographic checksum KPS is performed on the transmitter side and the checksum KPS is then transmitted to the integrity check verifying unit IPVE. On reception of a control data packet SD, in the present example, in each case, an item of check information PI is also created by the integrity check verifying unit and placed into temporary storage. Using the cryptographic checksum KPS received, the check information PI stored on the receiver side is verified in a verification step V. If a deviation or a manipulation is to be feared in one or more of the control data packets SD, the integrity check verifying unit IPVE initiates an emergency stop NH of the control unit SE2 receiving the manipulated control data SD2', as shown in FIG. 5. In the example shown in FIG. 5, the cryptographic check information PI consists of a plurality of entries, where one entry is made for each control data packet SD. In one possible embodiment, each entry consists of a time stamp, a hash value of the packet administration data and a hash value of the useful data. The packet administration data comprises, for example, a transmitter address, a receiver address and a protocol being used. In a further possible embodiment, a counter value contained in the control data SD can be added. The coding offers the advantage that, for unaltered values, i.e., header and useful data, no new hash value has to be calculated.

A possible embodiment of an item of cryptographic check information consisting of three entries is, for example:
20100517-163325 129.87.3.2 129.76.2.15 TCP/657-80 03AE6
20100517-163327 129.87.3.1 129.76.2.12 UDP/312 4A1EFE23
20100517-163412 129.87.3.4 129.77.2.14 TCP/80-3123 9E6B8A26

The cryptographic check information PI consists of three entries: a time stamp in the format YYYYMMDD-HHMSS, a transmitter IP address, a receiver IP address and a protocol (TCP/UDP). Furthermore, each entry has a transmitter port number and a receiver port number which each comprise a 32 bit hash value of the data field.

In a further type of coding, value ranges of measured variables or control instructions can be stipulated that are present within a particular timespan. This can be advantageous in a cyclic data communication in which a high degree of redundancy is present in the transmitted data.

The method according to the invention can be understood as a cryptographic integrity overlay network, where cryptographic check information can be transmitted via the integrity overlay in a manner that is secured against manipulation to verify the correct transmission of the control data SD.

If, in the method according to the invention, control data SD which are transmitted via the transmission network 2 are manipulated, this is recognized and a user is warned or a safety function is automatically triggered. In the event of a possible manipulation of the control data, a situation that jeopardizes the security of the respective system is prevented.

In the case of existing systems and plants, the method according to the invention can be implemented in a simple manner and retrofitted, because the control communication itself is not cryptographically protected, rather cryptographically protected monitoring of the control data transmission is additionally performed. The actual control communication remains unaltered in a method according to the invention. The inventive method can also be implemented in a resource-saving manner, because a separate cryptographic checksum does not have to be calculated for each control data packet SD.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for recognizing manipulation during transmission of control data from a first controller to a second controller via a transmission network, the first controller including a processor and memory and being connected to a first control network including a first gateway, the second control network including a second gateway, the first and second control networks comprising production cells in a production plant, the method comprising the steps of:
   (a) generating, by an integrity check generator arranged in the first gateway, integrity check information data on a transmitter side for the control data transmitted by the first controller connected to the first control network, the first controller transmitting the control data;
   (b) calculating a cryptographic checksum for the integrity check information data generated on the transmitter side by the integrity check generator using a cryptographic key;
   (c) transmitting, via the transmission network, the integrity check information data generated on the transmitter side and the corresponding cryptographic checksum calculated by the integrity check generator to an integrity check verifier arranged in the second gateway, the integrity check verifier verifying the cryptographic checksum on a receiver side using the cryptographic key;
   (d) generating, by the integrity check verifier, integrity check information data on the receiver side for the control data received by the second controller connected to the second control network; and
   (e) comparing, by the integrity check verifier, the integrity check information data generated on the receiver side by the integrity check verifier and the integrity check information data generated on the transmitter side and received together with the cryptographic checksum which is verified by the integrity check verifier to detect manipulation of the transmitted control data.

2. The method as claimed in claim 1, wherein the control data is transmitted unencrypted in control data packets which comprise packet administration data and useful data.

3. The method as claimed in claim 2, wherein the generated integrity check information data is formed by a hash value of at least one of at least part of the control data and the packet administration data contained in one of a control data packet and a number of control data packets.

4. The method as claimed in claim 1, wherein the generated integrity check information data is formed by a hash value of at least one of at least part of the control data and packet administration data contained in one of a control data packet and a number of control data packets.

5. The method as claimed in claim 4, wherein the integrity check information data is generated by the integrity check generator for each control data packet, the integrity check information data comprising:
   a hash value of the packet administration data of the control data packet;
   a hash value for the useful data of the control data packet; and
   a time stamp recording a time point of the generation of the integrity check information data on the transmitter side.

6. The method as claimed in claim 1, wherein the integrity check information data is generated at regular time intervals by the integrity check generator.

7. The method as claimed in claim 1, wherein the control data is transmitted via one of a wireless and a wire-bound transmission network in real time.

8. The method as claimed in claim 1, wherein the cryptographic checksum calculated by the integrity check generator is transmitted together with the integrity check information data generated on the transmitter side via one of the transmission network for the control data and a separate communication connection from the first controller to the second controller.

9. The method as claimed in claim 1, wherein, on recognizing a manipulation arising during transmission of the control data from the first controller to the second controller, the integrity check verifier generates an alarm signal and transmits the alarm signal to the second controller.

10. The method as claimed in claim 9, wherein, after reception of the alarm signal by the integrity check verifier, the second controller switches to an operationally secure state.

11. A data transmission system for transmitting control data from a first controller to a second controller via a transmission network, the first controller including a processor and memory and being connected to a first control network including a first gateway, the second controller being connected to a second control network including a second gateway, the first and second control networks comprising production cells in a production plant, the data transmission system comprising:
   (a) at least one integrity check generator arranged in the first gateway and configured to generate integrity check information data on a transmitter side for the control data transmitted by the first controller connected to the first control network and calculate a cryptographic checksum for the integrity check information data generated using a cryptographic key, the first controller transmitting the control data via the transmission network; and (b) at least one integrity check verifier arranged in the second gateway and configured to receive the integrity check information data generated by the integrity check generator arranged in the first gateway on the transmitter side, receive an associated calculated cryptographic checksum and verify the cryptographic checksum using the cryptographic key;

wherein the integrity check verifier generates the integrity check information data for the control data received by the second controller connected to the second control network on the receiver side and compares the integrity check information data generated on the receiver side with the integrity check information data received and generated on the transmitter side together with the verified cryptographic checksum to detect manipulation of the transmitted control data.

12. The data transmission system as claimed in claim 11, wherein the first and second gateways of the first and second control networks are connected to one another via the transmission network.

13. The data transmission system as claimed in claim 12, wherein at least one of the first control network, the second control network and the transmission network is an Ethernet.

14. The data transmission system as claimed in claim 13, wherein the Ethernet is a Profinet.

15. The data transmission system as claimed in claim 13, wherein the network is one of a train network, an energy control network and an automation control network, and wherein the automation control network is one of a process control network and a production control network.

16. The data transmission system as claimed in claim 12, wherein the first and second controllers each comprise sensors, actuators and a control computer.

17. The data transmission system as claimed in claim 12, wherein the network is one of a train network, an energy control network and an automation control network, and wherein the automation control network is one of a process control network and a production control network.

18. The data transmission system as claimed in claim 12, wherein the integrity check generator is integrated into the first gateway of the first control network and the integrity check verifier is integrated into the second gateway of the second control network.

19. The data transmission system as claimed in claim 11, wherein the first and second controllers each comprise sensors, actuators and a control computer.

20. The data transmission system as claimed in claim 19, wherein the network is one of a train network, an energy control network and an automation control network, and wherein the automation control network is one of a process control network and a production control network.

21. The data transmission system as claimed in claim 11, wherein the network is a vehicle network, an energy control network or an automation control network.

* * * * *